(12) United States Patent
Takahashi (10) Patent No.: US 10,259,116 B2
(45) Date of Patent: Apr. 16, 2019

(54) ROBOT SYSTEM

(71) Applicant: Fanuc Corporation, Yamanashi (JP)

(72) Inventor: Yuuki Takahashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 42 days.

(21) Appl. No.: 15/615,363

(22) Filed: Jun. 6, 2017

(65) Prior Publication Data

US 2017/0355079 A1 Dec. 14, 2017

(30) Foreign Application Priority Data

Jun. 13, 2016 (JP) .................................. 2016-117373

(51) Int. Cl.
*B25J 9/16* (2006.01)
*G06T 7/00* (2017.01)
(Continued)

(52) U.S. Cl.
CPC ........... *B25J 9/1653* (2013.01); *B25J 9/1671* (2013.01); *B25J 9/1676* (2013.01);
(Continued)

(58) Field of Classification Search
CPC ...... B25J 9/1653; B25J 9/1671; B25J 9/1676; G05B 2219/34466; G05B 2219/40202;
(Continued)

(56) References Cited

U.S. PATENT DOCUMENTS

2002/0186299 A1 12/2002 Cofer
2010/0191372 A1* 7/2010 Nihei ..................... B25J 9/1676
700/245
(Continued)

FOREIGN PATENT DOCUMENTS

EP 2730377 A2 5/2014
JP 2004530090 A 9/2004
(Continued)

OTHER PUBLICATIONS

Japan Patent Office, Decision to Grant a Patent dated May 29, 2018 for Japan Patent Application No. 2016-117373.
(Continued)

*Primary Examiner* — Khoi H Tran
*Assistant Examiner* — Robert T Nguyen
(74) *Attorney, Agent, or Firm* — Winstead PC (57) ABSTRACT

A robot system includes: a recognition means that recognizes an operator in distance image data as a security surveillance target; an area setting means that sets, in the distance image data, a common work area that a robot and the operator are allowed to enter; and a boundary setting means that sets, in the distance image data, a first boundary that the operator S is allowed to cross for entering the common work area but the robot is not allowed to cross, and a second boundary that the robot is allowed to cross for entering the common work area but the operator is not allowed to cross, wherein the crossing of the second boundary by the security surveillance target and the crossing of the first boundary by a non-target object not recognized as the security surveillance target are detected.

8 Claims, 8 Drawing Sheets

(51) Int. Cl.
*G06K 9/00* (2006.01)
*G06K 9/32* (2006.01)

(52) U.S. Cl.
CPC ....... *G06K 9/00771* (2013.01); *G06K 9/3216* (2013.01); *G06T 7/001* (2013.01); *G05B 2219/34466* (2013.01); *G05B 2219/40202* (2013.01); *G05B 2219/40203* (2013.01)

(58) Field of Classification Search
CPC . G05B 2219/40203; G06K 9/00; G06T 7/001
See application file for complete search history.

(56) References Cited

U.S. PATENT DOCUMENTS

| | | |
|---|---|---|
| 2014/0135984 A1 | 5/2014 | Hirata |
| 2017/0225336 A1* | 8/2017 | Deyle .................... B25J 13/086 |

FOREIGN PATENT DOCUMENTS

| | | |
|---|---|---|
| JP | 2007283450 A | 11/2007 |
| JP | 2008191823 A | 8/2008 |
| JP | 2010188515 A | 9/2010 |
| JP | 2010231713 A | 10/2010 |
| JP | 2012223831 A | 11/2012 |
| JP | 201494436 A | 5/2014 |
| WO | WO-02101279 A1 | 12/2002 |

OTHER PUBLICATIONS

Japan Patent Office, Memorandum of Decision to Grant a Patent dated May 29, 2018 for Japan Patent Application No. 2016-117373.
Japan Patent Office, Search Report dated May 29, 2018 for Japan Patent Application No. 2016-117373.

* cited by examiner

ROBOT SYSTEM

CROSS-REFERENCE TO RELATED APPLICATIONS

This application is based on and claims priority to Japanese Patent Application No. 2016-117373 filed on Jun. 13, 2016, the entire content of which is incorporated herein by reference.

TECHNICAL FIELD

The present invention relates to a robot system including a robot for workpiece transfer, workpiece processing, and the like, and particularly to a robot system having a security surveillance function during operation.

BACKGROUND ART

In a conventional robot system, a safety fence physically separates an operator area which an operator can enter and a robot area in which a robot operates. However, the operator sometimes needs to enter the robot area for workpiece supply, jig or mold exchange, and the like. Physical area separation using a safety fence is easy and safe but the operator needs to unlock the key of the safety fence door to enter the robot area, which is not good for improving productivity.

Recently, there is a robot system which is known in this technical field and which includes a light curtain provided between a robot area and an operator area, and a mat switch for switching between activation and deactivation of the light curtain in order to improve productivity. Without the weight of the operator applied to the mat switch, the light curtain is deactivated and the robot arm can move to the operator area. With the weight of the operator applied to the mat switch, the light curtain is activated and the entry of the operator or the robot arm to the detection area of the light curtain stops the operation of the robot (see PTL 1, for example).

There is another robot system which is known in this technical field and in which an image-acquisition device captures the robot and the operator in an angle of view and information regarding the distance between the image-acquisition device and the imaging targets is obtained for constant monitoring of the distance between the robot and the operator (see PTL 2, for example).

There is still another robot system which is known in this technical field and which includes a plurality of floor reflective markers provided in front of the robot area, an operator reflective marker provided on the operator, an LED light source that irradiates the robot area and the floor reflective markers with light, and a photodetector that receives light reflected by each reflective marker (see PTL 3, for example).

CITATION LIST

Patent Literature

{PTL 1}
Japanese Unexamined Patent Application, Publication No. 2007-283450
{PTL 2}
Japanese Unexamined Patent Application, Publication No. 2012-223831
{PTL 3}
Japanese Unexamined Patent Application, Publication No. 2010-231713

SUMMARY OF INVENTION

A robot system according to an aspect of the present invention includes: a distance image data acquisition device that chronologically and sequentially acquires distance image data containing at least a partial image of a work area for a robot and at least a partial image of an area that an operator or another robot is allowed to enter; a reference image data storage which stores at least one reference image data that is to be compared with an image appearing in the series of distance image data in order to recognize the operator or the other robot in the series of distance image data by the comparison; and a controller, wherein the controller conducts: a recognition process that refers to the reference image data and recognizes the operator or the other robot in the series of distance image data as a security surveillance target; an area setting process that sets a common work area in the series of distance image data, the common work area being an area that the robot is allowed to enter and the operator recognized as the security surveillance target or the other robot recognized as the security surveillance target is also allowed to enter; a boundary setting process that sets a first boundary and a second boundary in the series of distance image data, the first boundary being a boundary that the operator recognized as the security surveillance target or the other robot recognized as the security surveillance target is allowed to cross for entering the common work area but the robot or a non-target object not recognized as the security surveillance target is not allowed to cross, the second boundary being a boundary that the robot is allowed to cross for entering the common work area but the operator or the other robot is not allowed to cross; and a boundary crossing detection process that detects, in the series of distance image data, crossing of the second boundary by the security surveillance target and crossing of the first boundary by the non-target object not recognized as the security surveillance target.

DESCRIPTION OF EMBODIMENTS

A robot system according to a first embodiment of the present invention will be described below with reference to the drawings.

Figure 1:
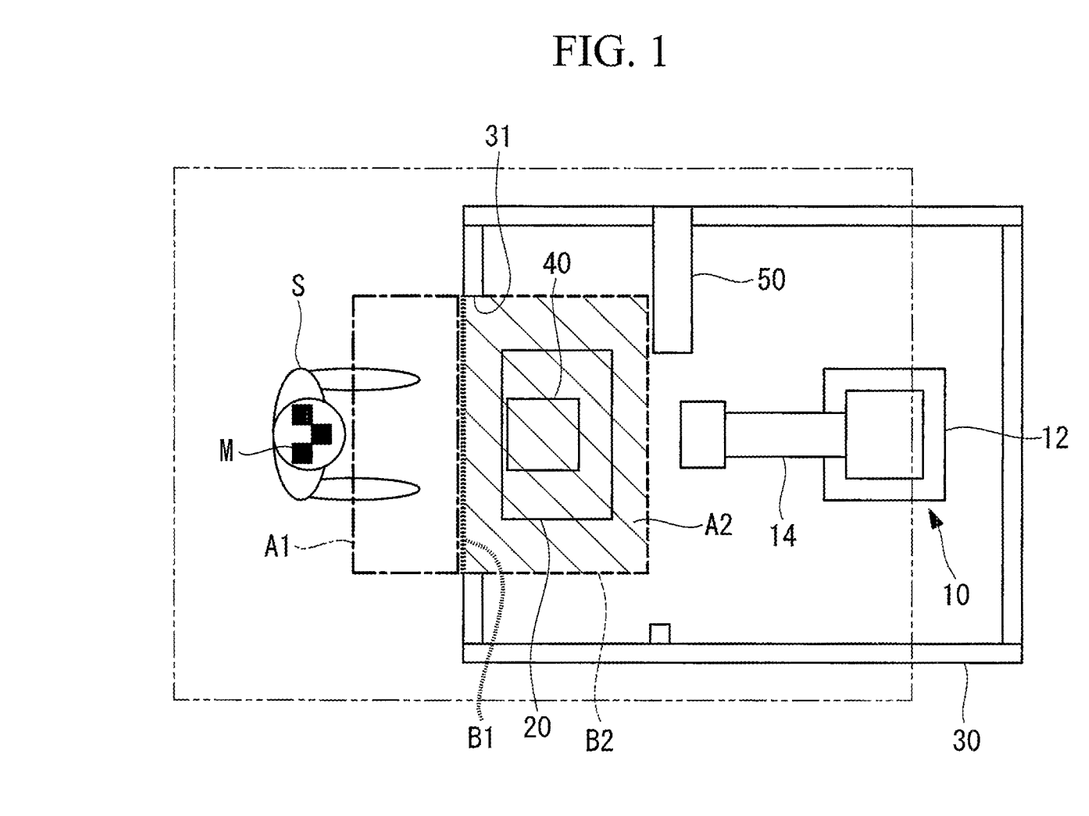
FIG. 1 is a schematic plan view of a robot system according to a first embodiment of the present invention.
Figure 2:
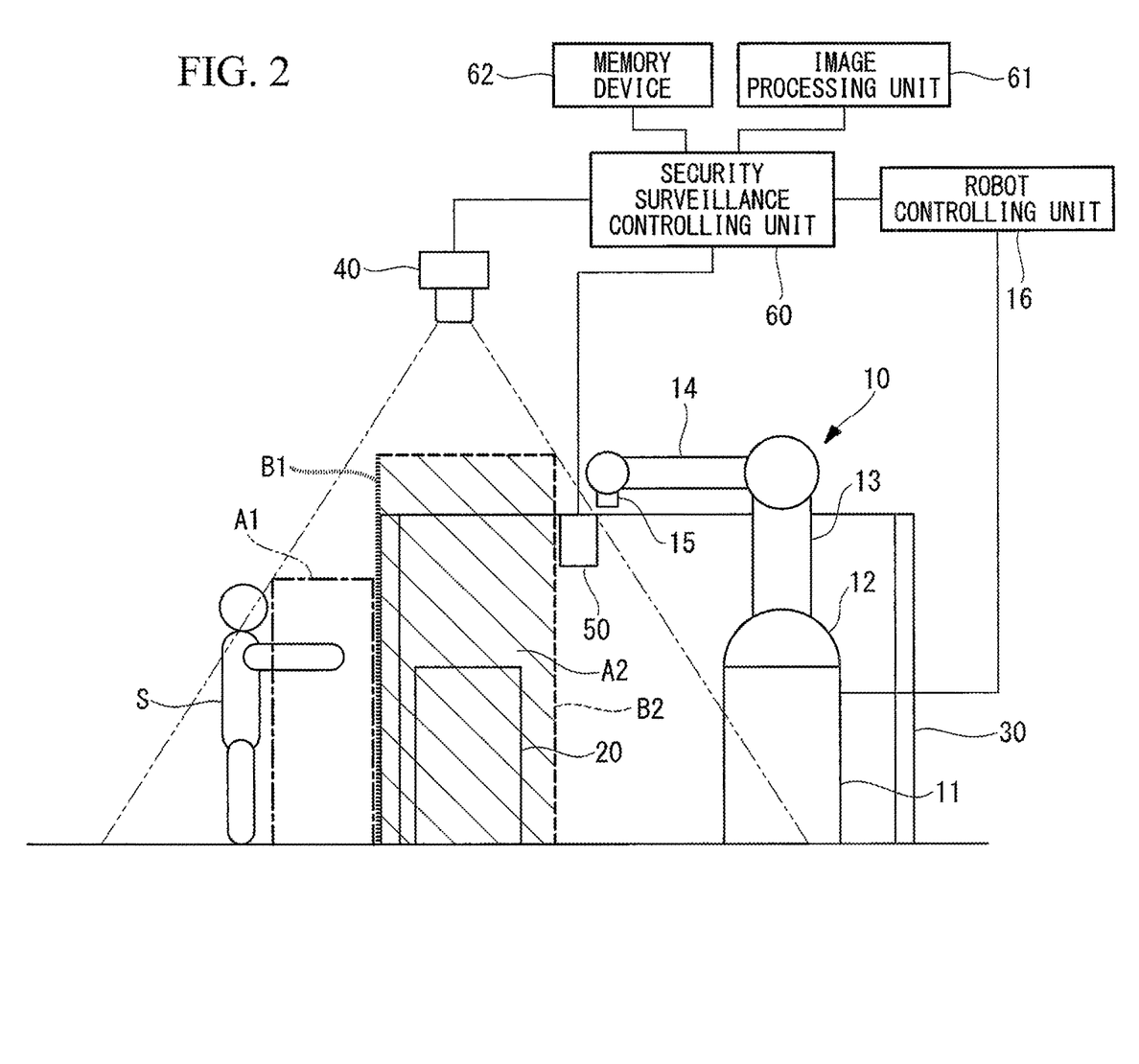
FIG. 2 is a schematic front view of the robot system according to the first embodiment.

As shown in FIGS. 1 and 2, this robot system includes a robot 10 conducting predetermined work, a workbench 20 on which the robot 10 conducts work, and a safety fence 30 surrounding the robot 10 and the workbench 20. With this robot system, an operator S sometimes put his hand or head above the workbench 20 to exchange or adjust a jig, mold, workpiece, and the like on the workbench 20. The safety fence 30 on the other side of the workbench 20 relative to the robot 10 is partly provided with openings 31 through which the operator S can access the workbench 20.

This robot system is provided with the following elements: a distance image sensor 40 which is provided above the workbench 20 and which captures at least part of the work area of the robot 10 and at least part of the operator-access area that the operator S can enter, and also which produces a time-series distance images in the view field indicated by the two-dot chain lines in FIGS. 1 and 2; and a display device 50 supported by the safety fence 30. The display device 50 has a liquid crystal panel. The display device 50 is provided in a position visible by the operator S near the opening 31. Here, acquisition of distance images with predetermined time intervals refers to time-series imaging, and continuous acquisition of distance images with no time intervals also refers to time-series imaging.

The robot 10 includes, for example, a base 11 fixed to the floor, a basal section 12 rotatably supported by the base 11 around a vertical axis, a base-side arm 13 rotatably supported by the basal section 12 around a substantially horizontal axis, a distal-end-side arm 14 rotatably supported by the distal end of the base-side arm 13 around a substantially horizontal axis, and a distal end portion 15 rotatably supported by the distal end portion of the distal-end-side arm 14 around a substantially horizontal axis, so that the distal end portion 15 can move the workpiece on the workbench 20, perform processing and the like on the workpiece, or the like.

The robot 10 is provided with a servomotor for rotating the basal section 12, a servomotor for rotating the base-side arm 13, a servomotor for rotating the distal-end-side arm 14, and a servomotor for rotating the distal end portion 15, and each servomotor is connected to the robot controlling unit 16 and controlled by the robot controlling unit 16.

The distance image sensor 40 may be, for example, a stereo camera or a time-of-flight (TOF) type of distance image sensor. The distance image sensor 40 can obtain information about the distances, regarding the pixels of the captured images, between the captured subject and the distance image sensor 40.

This robot system includes a security surveillance controlling unit 60 that receives distance images captured by the distance image sensor 40 together with the information regarding the distances, and performs various types of judgements according to the received distance images. The security surveillance controlling unit 60 is also connected to the robot controlling unit 16 and the display device 50 and controls the robot controlling unit 16 and the display device 50 depending on the judgement results.

The security surveillance controlling unit 60 includes an image processing unit 61 and a memory device 62. The security surveillance controlling unit 60 performs known image processing such as binarization on each distance image received from the distance image sensor 40 in accordance with an image processing program stored in the memory device 62, and stores the processed images together with the corresponding distance images in the memory device 62. The memory device 62 may include a temporary memory. Accordingly, the processed images, distance images, and information regarding distances are stored in the memory device 62 in chronological order. Although a combination of the processed image, distance image, and information regarding distances is treated as distance image data in this embodiment, a combination of the processed image and information regarding distances, a combination of the distance image and information regarding distances, or any other similar information may be treated as distance image data.

Further, the security surveillance controlling unit 60, which is operated by the image processing program, determines or estimates height-position coordinate of each of the pixels in each distance image, referring to the information regarding distances contained in the distance image data, and stores each height-position coordinate in the memory device 62 as part of the distance image data.

The security surveillance controlling unit 60 operates according to a security surveillance program stored in the memory device 62 and performs security surveillance using the distance image data. An operation of the security surveillance controlling unit 60 in this case will be explained below with reference to the flow chart of FIG. 3.

Figure 3:
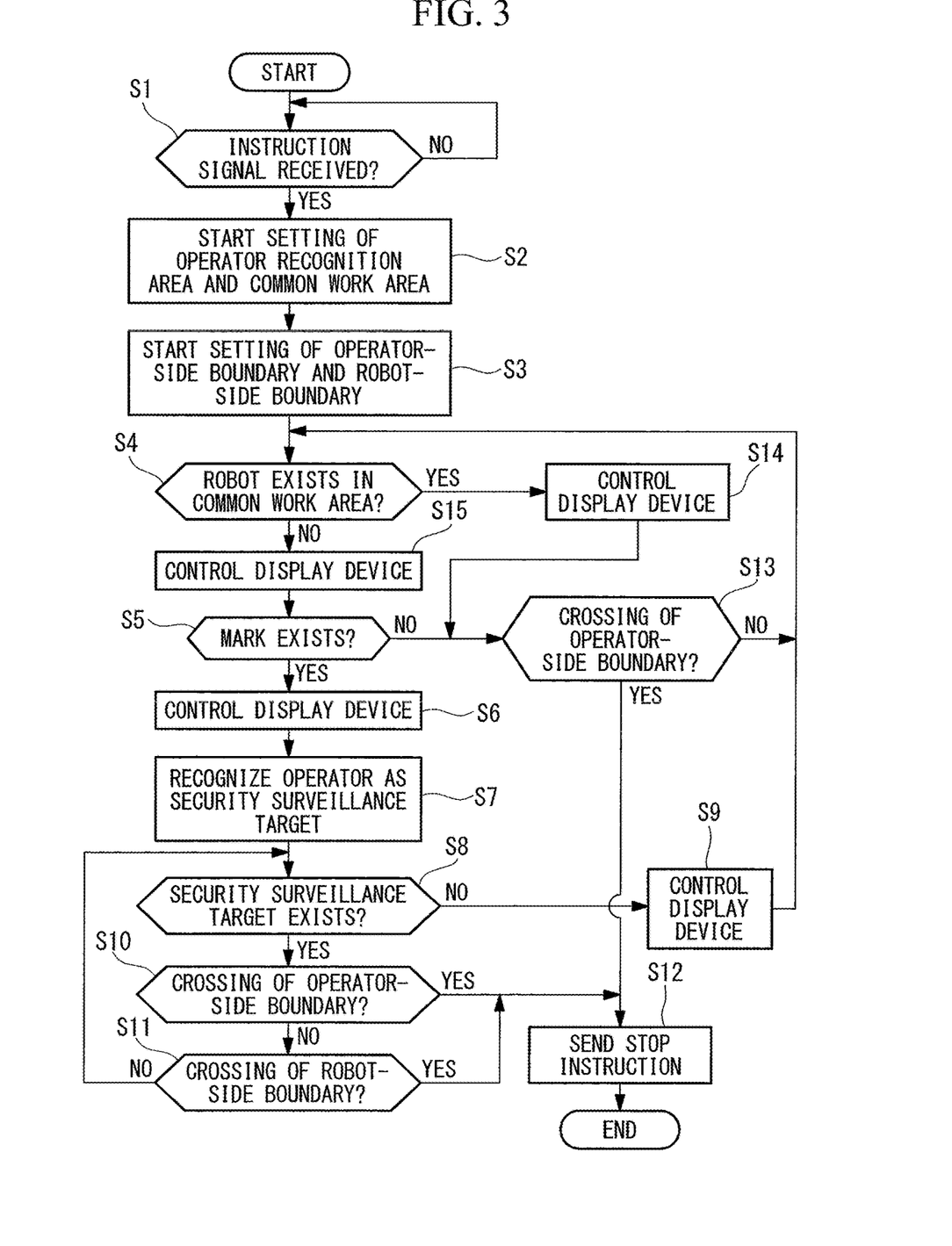
FIG. 3 is a flow chart of an example operation of a security surveillance controlling unit in the robot system according to the first embodiment.

For example, the operator S inputs an instruction to start surveillance through an input unit not shown in the drawings and, upon reception of this instruction signal (Step S1), the security surveillance controlling unit 60 starts processing for setting, in chronological order, an operator recognition area A1 and a common work area A2 shown in FIGS. 1 and 2 for a series of distance image data (Step S2). For example, the operator recognition area A1 and the common work area A2 are set in the distance image or the processed image in each piece of distance image data. The operator recognition area A1 is the area enclosed by the chain lines in FIGS. 1 and 2, and the common work area A2 is the hatched area in FIGS. 1 and 2. The common work area A2 is an area that is accessible by both of the operator S and the robot 10.

The security surveillance controlling unit 60 starts processing for setting, in chronological order, an operator-side boundary B1 and a robot-side boundary B2 shown in FIGS. 1 and 2 for a series of distance image data (Step S3). For example, the operator-side boundary B1 and the robot-side boundary B2 shown in FIGS. 1 and 2 are set in the distance image and the processed image in each piece of distance image data. The operator-side boundary B1 is a boundary plane that the operator S crosses to access the common work area A2, and the robot-side boundary B2 is a boundary plane that the robot 10 crosses to access the common work area A2.

The security surveillance controlling unit 60 determines whether the robot 10 is in the common work area A2 (Step S4). If the robot 10 is in the common work area A2, Step S4 and its following steps are skipped, Step S13 explained later is performed, and the process returns to Step S4. While the robot 10 is in the common work area A2, the display device 50 indicates the presence of the robot 10 in a predetermined area (Step S14).

Hence, the operator S can notice that work cannot be conducted yet in the common work area A2. In Step S13, the security surveillance controlling unit 60 determines whether a non-target object, which is not recognized as a security surveillance target, or the robot 10 has crossed the operator-side boundary B1 (Step S13). If such entry is detected in Step S13, a stop instruction to stop the robot 10 is sent to the robot controlling unit 16 (Step S12).

If the robot 10 has not entered the common work area A2, the display device 50 indicates the absence of the robot 10 in the work area (Step S15). Hence, the operator S can recognize the absence of the robot in the common work area A2.

Next, the security surveillance controlling unit 60 refers to a series of distance image data in chronological order and then determines whether a mark M shown in FIG. 1, for example, is present in the operator recognition area A1 in any processed images thereof (Step S5). If no mark M is present, Step S13 is carried out as in the case where the robot 10 is in the common work area A2 in Step S4, and the process returns to Step S4.

In this embodiment, the mark M consists of three black square portions painted on the top surface of the helmet or cap of the operator S. The three square portions are arranged in the width direction of the operator S (right and left direction), and the square portion at the center is located at a front-side position of the operator S relative to the two other portions. Thus, comparing the mark M enables the determination or estimation of the direction the operator S faces.

It should be noted that the memory device 62 stores a reference image of the mark M as reference image data, and the security surveillance controlling unit 60 compares, by the security surveillance program, the image of the mark M in the distance image data to the reference image of the mark M in the reference image data, and determines the presence or absence of the mark M in Step S5 through a known image matching technique such as correlation matching or edge matching. To be specific, if they match with similarity greater than a reference threshold, it is determined in Step S5 that the mark M is present.

It should be noted that reference image data may contain a plurality of reference images other than that of the mark M. In this case, the security surveillance controlling unit 60 compares the image in the distance image data to a plurality of reference images. The mark M may have a two-dimensional code or a unique shape.

It should be noted that the square portions are made of a low-reflective or high-reflective material the which cannot express the height thereof in distance image data. Although it is determined that the mark M is present if the mark M is completely inside the operator recognition area A1 in this embodiment, it may be determined that the mark M is present if the mark M is partly inside the operator recognition area A1.

Alternatively, the operator recognition area A1 can be omitted, and then whether the mark M is present in the processed image may be determined in Step 5.

If it is determined that the mark M is present in the operator recognition area A1 in Step S5, the display device 50 displays the presence of the operator S in a predetermined area (Step S6). The security surveillance controlling unit 60 recognizes an object (e.g., an operator), which is captured together with the mark M in a series of distance images corresponding to the respective processed images and moves with the movement of the mark M, as a security surveillance target (Step S7).

Figure 4:
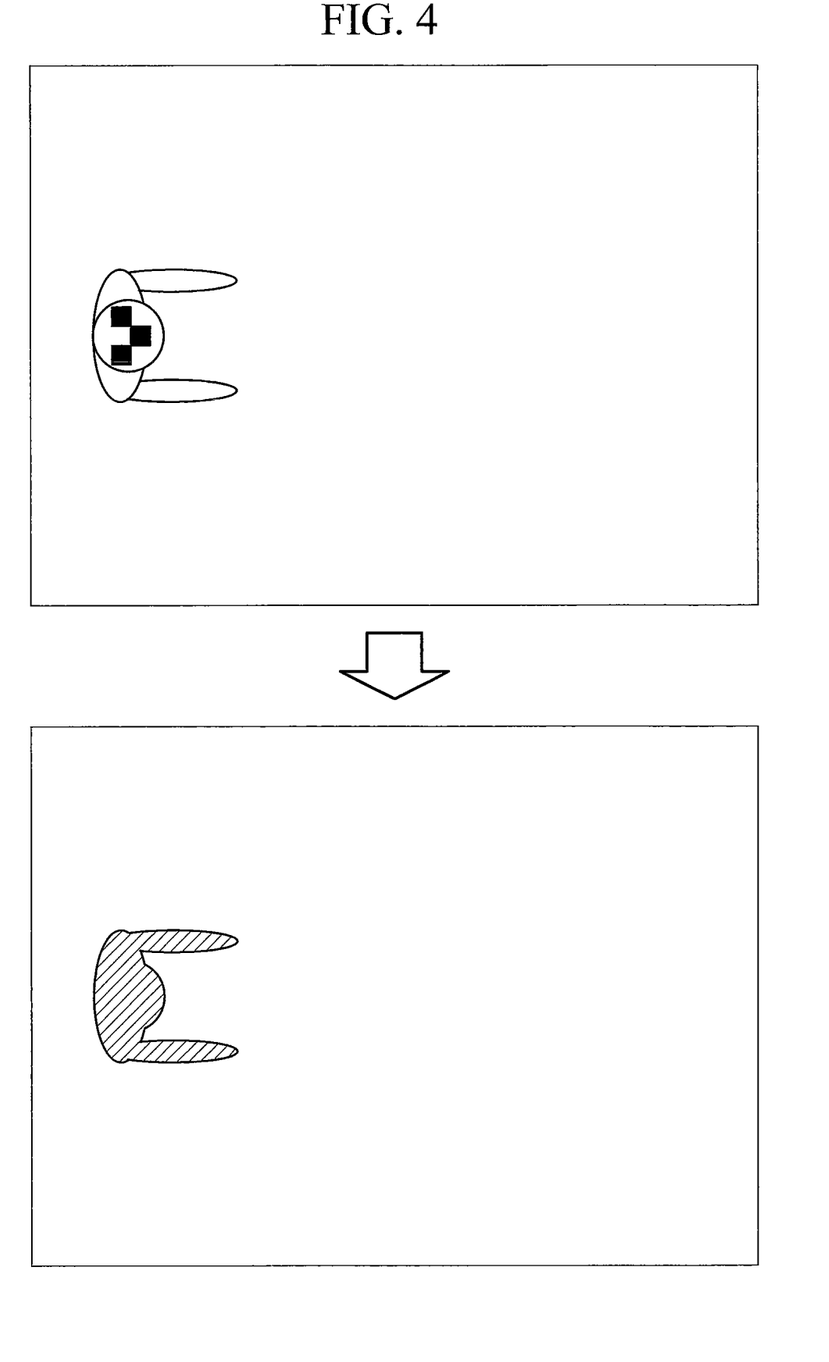
FIG. 4 is a diagram of a part of a distance image related to the robot system according to the first embodiment.
Figure 5:
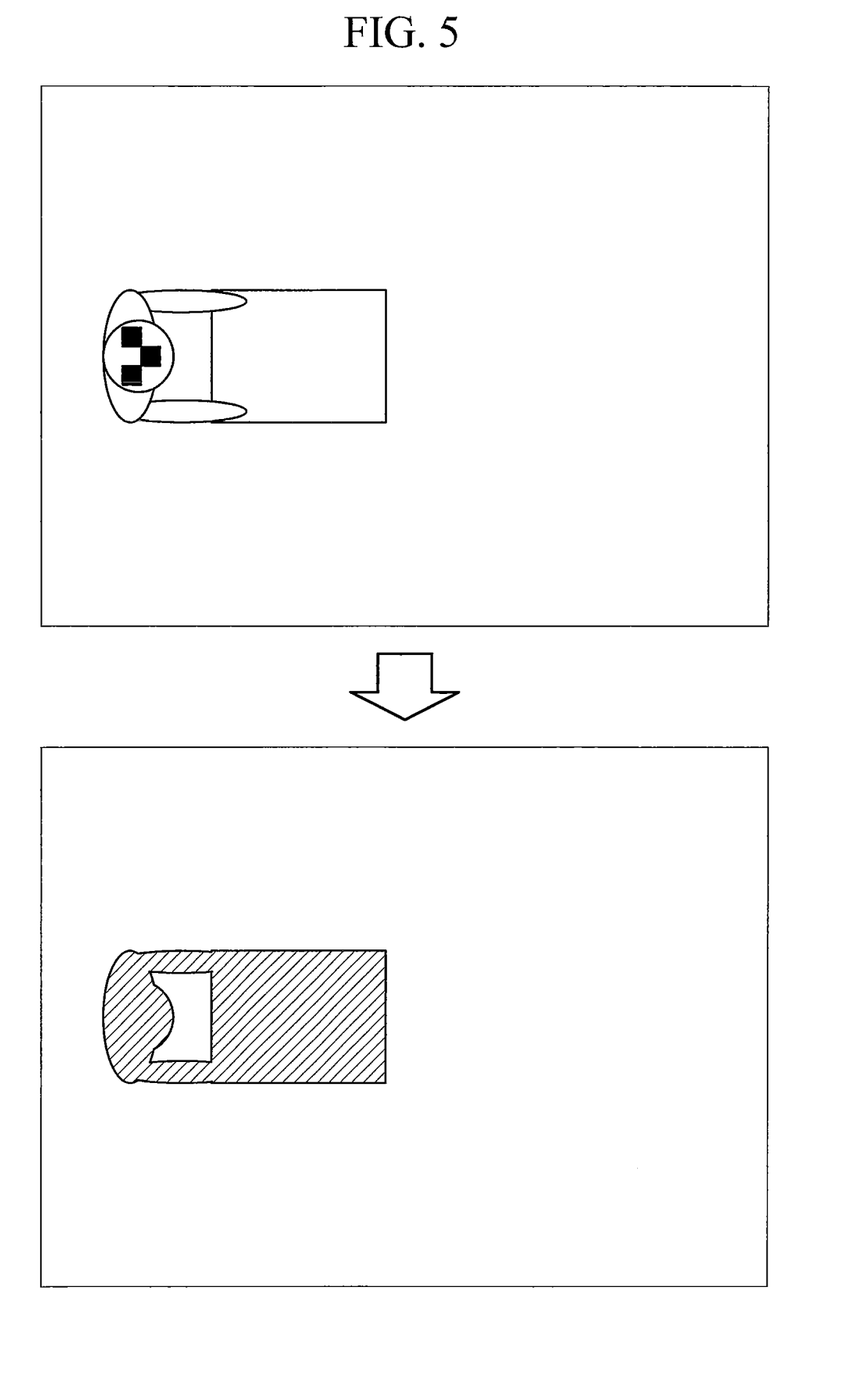
FIG. 5 is a diagram of a part of a distance image related to the robot system according to the first embodiment.
Figure 6:
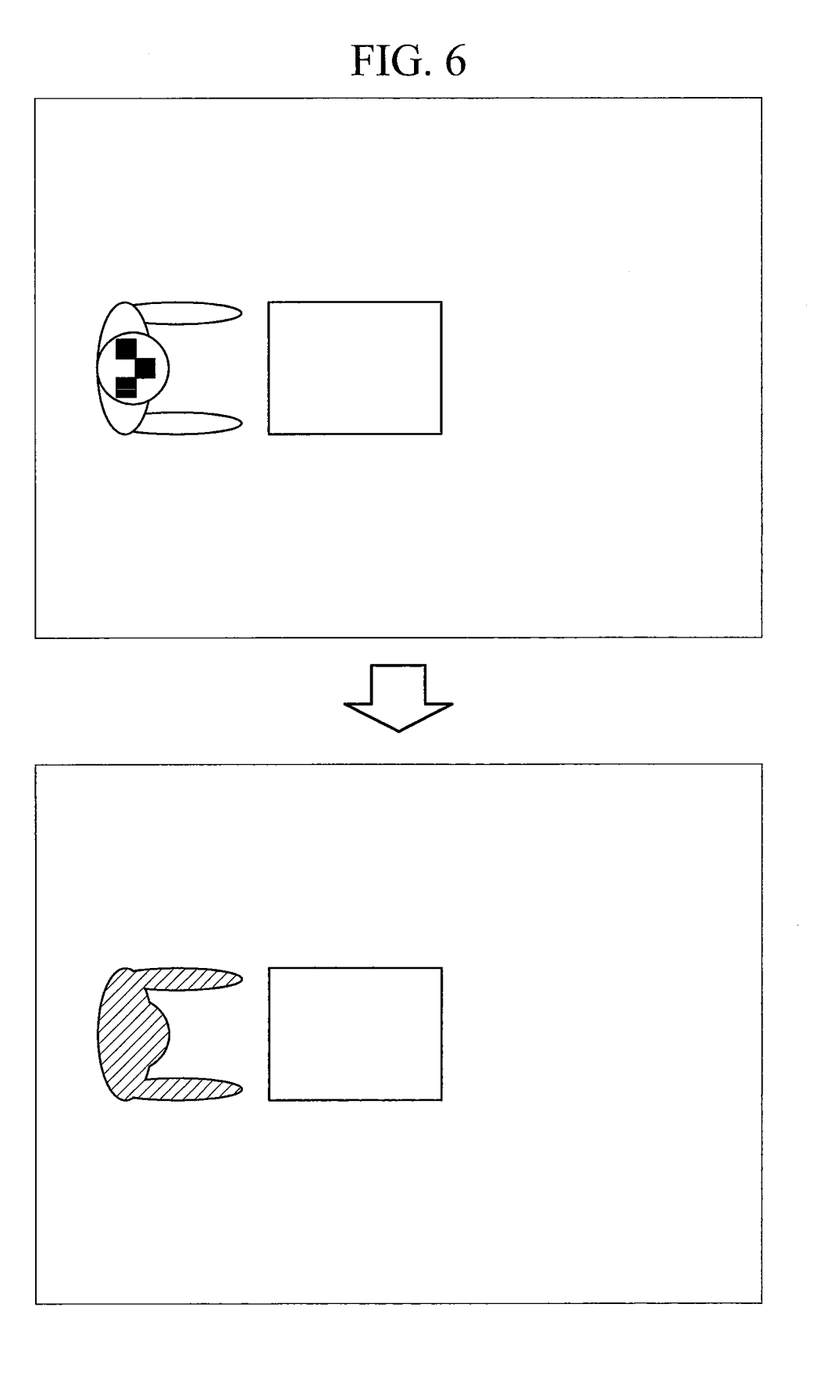
FIG. 6 is a diagram of a part of a distance image related to the robot system according to the first embodiment.

For example, in the case of the distance image shown in the upper drawing of FIG. 4, the hatched area in the lower drawing is recognized as a security surveillance target. In the case of the distance image shown in the upper drawing of FIG. 5 where the operator S moves with and is in contact with a carriage, the hatched area in the lower drawing is recognized as a security surveillance target. In the case of the distance image shown in the upper drawing of FIG. 6 where the operator S is away from the carriage, the hatched area in the lower drawing is recognized as a security surveillance target. In the case of FIG. 6, the carriage is recognized as a non-target object which is not a security surveillance target.

It should be noted that the reference image data stored in the memory device 62 may include a reference image expressing the shape of the operator S viewed from the above. In this case, in Step S5 and/or S7, the security surveillance controlling unit 60 compares an image in the distance image data to the reference image. If any image in the distance image data matches the reference image with similarity greater than a reference threshold, the object related to the image is recognized as a security surveillance target.

Next, the security surveillance controlling unit 60 refers to a series of distance image data in chronological order and determines whether the security surveillance target is still present in the operator recognition area A1 or the distance images (Step S8). If it is no longer there, the display device 50 is controlled to display the absence of the operator S in the predetermined area (Step S9).

Next, the security surveillance controlling unit 60 determines whether a non-target object, which is not recognized as a security surveillance target, has crossed the operator-side boundary B1 (Step S10). For example, if someone without a mark M on his helmet, i.e., someone who is probably not an operator S, or an operator S with poor knowledge for safe work enters the area, he is recognized as not a security surveillance target but a non-target object and whether he has crossed the operator-side boundary B1 is determined.

Further, the security surveillance controlling unit 60 refers to a series of distance image data in chronological order and determines whether a security surveillance target has crossed the robot-side boundary B2 or whether a non-target object, which is not recognized as a security surveillance target, has crossed the robot-side boundary B2 (Step S11).

If such entry is confirmed in Step S10 or Step S11, a stop instruction to stop the robot 10 is sent to the robot controlling unit 16 (Step S12).

Although the entry of the security surveillance target is determined when the security surveillance target partially overlaps the operator-side boundary B1 or robot-side boundary B2 in the distance images in the distance image data in Steps S10 and S11, the entry may be determined when the security surveillance target crosses over the operator-side boundary B1 or the robot-side boundary B2 in the distance images in the distance image data.

In this embodiment, the operator S is recognized as a security surveillance target in the chronologically sequentially obtained distance image data and the operator S is therefore tracked in a series of distance image data. Consequently, the operator S can be monitored without missing in the series of distance image data. This ensures the detection of the entry of the operator S to the prohibited area (the robot-side boundary B2). Although the robot 10 is stopped after the detection of the entry in this embodiment, the robot 10 may be instructed to perform hazard preventing operation.

In a series of distance image data, the operator-side boundary B1 (the first boundary) crossed for access from the operator S side to the common work area A2, and the robot-side boundary B2 (the second boundary) of the common work area A2 on the robot 10 side are set. An object recognized as a security surveillance target can cross the operator-side boundary B1 and access to the common work area A2, although the crossing of the operator-side boundary B1 for access to the common work area A2 by a non-target object which is not recognized as a security surveillance target is detected. For this reason, when someone, for example, who is not an operator S and has poor knowledge for safe work moves toward the common work area A2, his movement is detected once he crosses the operator-side boundary B1. Hence, for example, stopping the robot 10 or the hazard preventing operation conducted by the robot 10 avoids a contact between the robot 10 and someone with poor knowledge for safe work.

Since the robot 10 is a non-target object, in the event of anomaly, for example, when the robot 10 goes through the common work area A2 and crosses the operator-side boundary B1, the anomaly can be detected. Alternatively, in the event of anomaly, such as unintentional movement of a jig or workpiece in the common work area A2 toward the operator S side, and anomaly, such as when a jig or workpiece that the operator S has goes out of the operator S's hands and enters the common work area A2, these anomalies can be detected.

It should be noted that the process time can be shortened and the risk of false detection can be reduced by a configuration which attempts to check the mark M near an area where the mark M is recognized in the frame before the present frame, in tracking the operator S in a series of distance image data.

In addition, more than one operator S may be recognized as security surveillance targets. In this case, the operators S are each subjected to the aforementioned processing. In other words, the aforementioned processing for security surveillance is continued until the time when all the operators S are not recognized.

This embodiment, which stops the robot 10 upon the detection of its entry, is advantageous for ensuring the security of the operator S and preventing a breakdown in the robot 10.

In addition, since not only the operator S but objects carried by the operator S are recognized as security surveillance targets, a contact between the objects and the robot 10 can be avoided, which is very advantageous for ensuring the security of the operator S and preventing a breakdown in the robot 10.

Even upon the detection of the entry, the robot 10 may be allowed to continue work outside the common work area A2. In this case, the security of the operator S is ensured without decreasing the usage rate of the robot 10.

Further, in this embodiment, the reference image data stored in the memory device 62 is compared to the image of the mark M on the operator S that appears in a series of distance image data. In this comparison, the object matching the image of the mark M in the series of distance image data is recognized as a security surveillance target. Accordingly, comparing the mark M enables the recognition of the security surveillance target regardless of the figure of the operator S, thereby providing a safe environment for the operator S easily and certainly.

It should be noted that, the security surveillance controlling unit 60, which determines such entry in Step S10 or S11, may also determine whether the images in a series of distance image data which correspond the mark M has changed more greatly than a predetermined reference extent. For example, as in Step S10 or S11, it may determine that the image corresponding to the mark M has changed more greatly than the predetermined reference extent when the image which matches the reference image data of the mark M with similarity greater than a reference threshold disappears in the series of distance image data.

To be specific, the mark M is provided on the helmet of the operator S, when the operator S moves to an abnormal work position and an obstruction is placed between the distance image sensor 40 and the helmet or when the operator S takes abnormal posture, the shape of the mark M changes when viewed from the distance image sensor 40. In this case, the robot 10 is stopped, which is very advantageous for ensuring the security of the operator S.

It should be noted that a mark M can be placed on more than one portion on the helmet or on the shoulders of the operator S. Thus, even when the operator S tilts his head within a range which can be normally expected, it is determined that the images of the other portions of the marks M on the helmet or the marks M on the shoulders match the reference image data.

In this embodiment, the operator S knows whether he is recognized as a security surveillance target by watching the display device 50 and therefore his entry to the common work area A2 for work without being recognized as a security surveillance target or the occurrence of waiting time during which he has to wait because he does not know if he is recognized as a security surveillance target are prevented.

It should be noted that the reference image data in the memory device 62 preferably contains information on the height and figure of the operator S. Since distance image data contains the height levels of the head and shoulders of the operator S in the distance image, if the reference image data contains information on height levels of the head and shoulders of the operator S allowed to conduct work, whether one with the mark M on his helmet is someone allowed to conduct work can be determined.

In this case, if it is determined that the one with the mark M on his helmet is not someone allowed to conduct work, the security surveillance controlling unit 60 determines, according to the security surveillance program, that this one is a non-target object and stops the robot 10 when it crosses the operator-side boundary B1.

It should be noted that one without a mark M crossing the operator-side boundary B1 is also recognized as a non-target object by the security surveillance controlling unit 60, and the security surveillance controlling unit 60 stops the robot 10 when this one crosses the operator-side boundary B1.

Further, a robot mark may be provided on the robot 10 and the memory device 62 may store robot reference image data which is checked against the robot mark on the robot 10 in a series of distance image data and is used for recognizing the robot 10 in the series of distance image data through this comparison. In this case, the security surveillance controlling unit 60 also recognizes the robot 10 as a security surveillance target robot like the operator S and can detect any object, other than the security surveillance target robot in the series of distance image data, that crosses the robot-side boundary B2.

This allows the robot 10 to be tracked. Thus, when the robot 10 crosses the operator-side boundary B1 of the common work area A2 that the operator S is allowed to cross but the robot 10 is not allowed to cross and when the robot 10 moves abnormally, these facts can be immediately noticed, which is advantageous for improving security.

In this embodiment, the operator recognition area A1, the common work area A2, the operator-side boundary B1, and the robot-side boundary B2 are set in the distance image data. Alternatively, the operator recognition area A1, the common work area A2, the operator-side boundary B1, and the robot-side boundary B2 may be preliminarily indicated on the floor with tapes or the like, and these areas and boundaries captured in the distance image may be used as the operator recognition area A1, the common work area A2, the operator-side boundary B1, and the robot-side boundary B2. In this case, when an object overlaps the operator-side boundary B1 or the robot-side boundary B2 in the distance image, it is determined that the object has crossed these boundaries.

Another method can be used for the recognition of the operator S. For example, in the case of an object captured by the distance image sensor 40 and assumed to be the operator S, whether the image of the object existing between the first level of the highest part (the top of the head) and the second level (which is higher than the shoulders) a predetermined distance lower than the first level is approximate to a circle is determined. If the image is approximate to a circle, it is recognized as the operator S's head, and the image of the object existing between the third level, which is lower than the second level, and the fourth level, which is lower than the third level, is trimmed into a rectangular approximate to that image. If the longer length of the rectangular is more than the product of the shorter length and a predetermined number, it is recognized as shoulders. It should be noted that the third level and the fourth level are arranged such that shoulders appear therebetween. If the head and shoulders are recognized in this manner, the object can be recognized as the operator S.

A robot system according to the second embodiment of the present invention will now be described with reference to the drawings.

Figure 7:
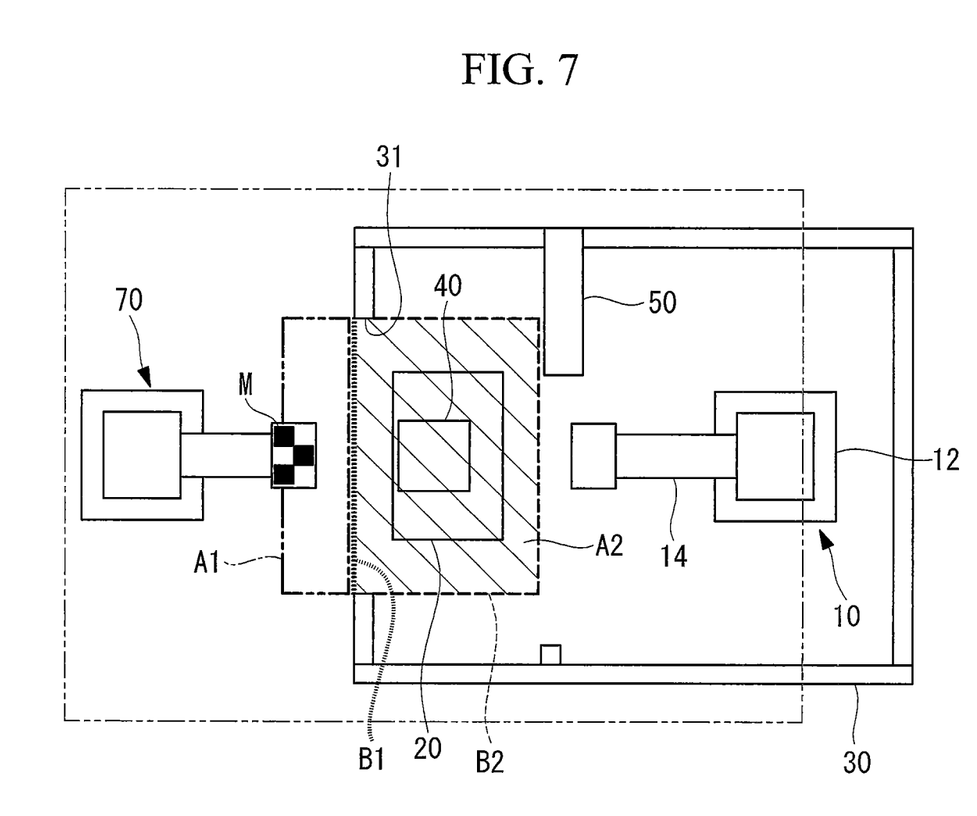
FIG. 7 is a schematic plan view of a robot system according to a second embodiment of the present invention.
Figure 8:
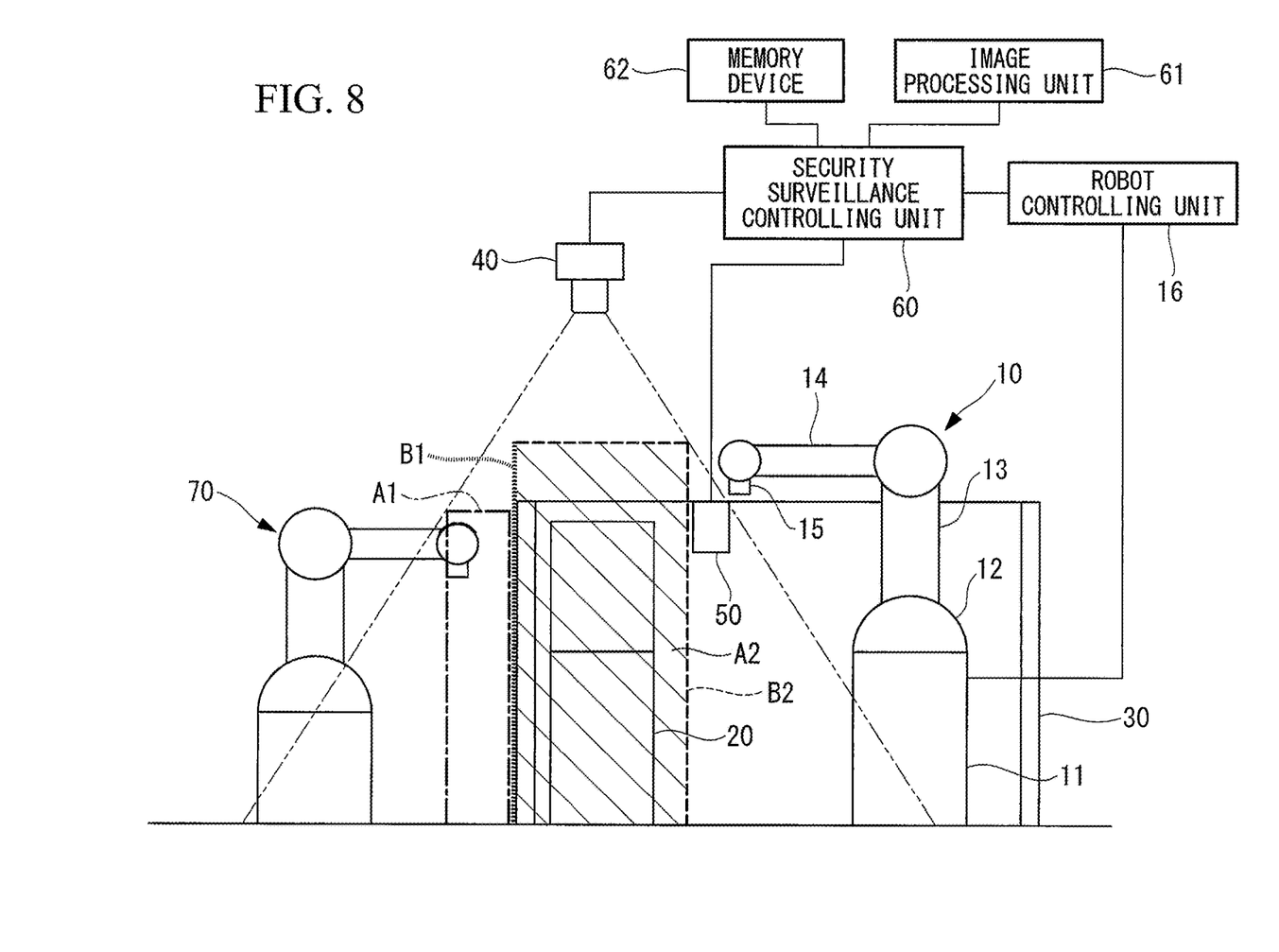
FIG. 8 is a schematic front view of the robot system according to the second embodiment.

In this embodiment, as shown in FIGS. 7 and 8, another robot 70 is provided instead of an operator S unlike in the first embodiment. A mark M is provided in the distal end portion of the robot 70, and the robot 70 conducts the same work as the operator S.

Although the robot 70 is used instead of the operator S in this embodiment, the other configuration is the same as that of the first embodiment. For this reason, for instance, the operator recognition area A1 of the first embodiment serves as an area where the robot 70 is recognized, and the operator-side boundary B1 of the first embodiment serves as a boundary for the robot 70. Although there is a slight difference in that, in Step S7, the surveillance target is changed from the operator S to the robot 70 and the robot 70 captured in an image together with the mark M therefore serves as a security surveillance target, the processing performed by the security surveillance controlling unit 60 and the other configuration are substantially the same as in the first embodiment.

Consequently, also in this embodiment, the robot 70 is recognized as a security surveillance target in the chronologically sequentially obtained distance image data and the robot 70 is tracked in a series of distance image data. Accordingly, the robot 70 can be monitored without missing in the series of distance image data. This ensures the detection of the inhibited crossing of a boundary (the robot-side boundary B2) by the robot 70 and can stop the robot 10 after the detection and even instruct the robot 10 to conduct a hazard preventing operation, for example. In this manner, the robot 70 can be tracked with a simple configuration, thereby preventing a contact between the robot 10 and the other robot 70.

The other configuration of the first embodiment and modifications can also be understood by replacing the operator S with the robot 70.

A robot system according to an aspect derived from the aforementioned embodiments includes: a distance image data acquisition device that chronologically and sequentially acquires distance image data containing at least a partial image of a work area for a robot and at least a partial image of an area that an operator or another robot is allowed to enter; a reference image data storage which stores at least one reference image data that is to be compared with an image appearing in the series of distance image data in order to recognize the operator or the other robot in the series of distance image data by the comparison; and a controller, wherein the controller conducts: a recognition process that refers to the reference image data and recognizes the operator or the other robot in the series of distance image data as a security surveillance target; an area setting process that sets a common work area in the series of distance image data, the common work area being an area that the robot is allowed to enter and the operator recognized as the security surveillance target or the other robot recognized as the security surveillance target is also allowed to enter; a boundary setting process that sets a first boundary and a second boundary in the series of distance image data, the first boundary being a boundary that the operator recognized as the security surveillance target or the other robot recognized as the security surveillance target is allowed to cross for entering the common work area but the robot or a non-target object not recognized as the security surveillance target is not allowed to cross, the second boundary being a boundary that the robot is allowed to cross for entering the common work area but the operator or the other robot is not allowed to cross; and a boundary crossing detection process that detects, in the series of distance image data, crossing of the second boundary by the security surveillance target and crossing of the first boundary by the non-target object not recognized as the security surveillance target.

In this aspect, the operator or the other robot is recognized as a security surveillance target in the chronologically and sequentially obtained distance image data and the operator or the other robot is therefore tracked in the series of distance image data. Consequently, the operator or the other robot can be monitored without missing in the series of distance image data. This ensures the detection of the crossing of the second boundary by the operator or the other robot, and, for example, by stopping the robot after the detection or by a hazard preventing operation by the robot, a contact between the robot and the operator or the other robot can be avoided.

In addition, in the series of distance image data, the first boundary crossed for access from the operator or the other robot side to the common work area, and the second boundary of the common work area on the robot side are set. Further, an object recognized as a security surveillance target can cross the first boundary to enter the common work area, and the crossing of the first boundary for entering the common work area by a non-target object which is not recognized as a security surveillance target is detected. With this configuration, when someone, for example, who is not an operator and has poor knowledge for safe work moves toward the common work area, his movement is detected once he crosses the first boundary. Hence, for example, stopping the robot or the hazard preventing operation conducted by the robot avoids a contact between the robot and someone with poor knowledge for safe work.

In this aspect, it is preferable that a robot stop means be further included which stops the robot when the boundary crossing detection means detects the crossing by the security surveillance target or the non-target object.

This configuration, which stops the robot in the event of an operational error in the robot or unintentional movement of the jig or workpiece, is advantageous for ensuring the security of the operator or preventing a breakdown in the robot.

In this aspect, it is preferable that, in the series of distance image data, the recognition means is configured to recognize an object which is integrated with the operator or the other robot and which moves together with the operator and the other robot as the security surveillance target.

With this configuration, not only the operator or the other robot but objects carried by the operator or the other robot are recognized as security surveillance targets, so that a contact between the objects and the robot is avoided, which is very advantageous for ensuring the security of the operator and preventing a breakdown in the robot.

In this aspect, it is preferable that the reference image data is compared to a mark provided on the operator or the other robot appearing in the series of distance image data, and is used to recognize, by the comparison, the object integrated with an image corresponding to the mark in the series of distance image data as the security surveillance target.

With this configuration, comparing the mark enables the recognition of the security surveillance target regardless of the figure of the operator or the type of the other robot, thereby providing a safe environment for the operator and avoiding a contact between the robot and the other robot easily and certainly.

In this aspect, it is preferable that the robot stop means is configured to stop the robot when the image corresponding to the mark in the series of distance image data changes more greatly than a predetermined reference extent.

For instance, with the mark on the helmet of the operator, if the operator moves to an abnormal work position and an obstruction is placed between the distance image-acquisition device and the helmet or if the operator takes abnormal posture, the shape of the mark changes when viewed from the distance image-acquisition device. In this case, the robot is stopped, which is very advantageous for ensuring the security of the operator.

In this aspect, it is preferable that the robot system further includes a display device for displaying that the security surveillance target in the series of distance image data is being recognized by the recognition means.

The operator knows if he is recognized as a security surveillance target by watching the display device and therefore does not enter the common work area for work without being recognized as a security surveillance target, thereby preventing the occurrence of waiting time during which he does not know if he is recognized as a security surveillance target.

In this aspect, it is preferable that the reference image data contains information regarding a height and a figure of the operator.

This configuration keeps someone, who is, for example, wearing a helmet with a mark but not authorized, from conducting work in the common work area, which is very advantageous for improving security.

In this aspect, it is preferable that the reference image data storage stores robot reference image data that is to be compared with a robot mark provided on the robot in the series of distance image data in order to recognize the robot in the series of distance image data by the comparison, the recognition means refers to the robot reference image data and recognizes the robot in the series of distance image data as a security surveillance target robot, and the boundary crossing detection means detects crossing of the second boundary by an object other than the security surveillance target robot in the series of distance image data.

This configuration enables to track the position of the robot. Thus, when the robot crosses the first boundary of the common work area that the operator is allowed to cross but the robot is not allowed to cross, and when the robot moves abnormally, these facts can be immediately detected, which is advantageous for improving security.

The aforementioned aspects can improve the reliability of security surveillance.

REFERENCE SIGNS LIST 10 robot
16 robot controlling unit
20 workbench
30 safety fence
31 opening
40 distance image sensor
50 display device
60 security surveillance controlling unit
61 image processing unit
62 memory device
A1 operator recognition area
A2 common work area
B1 operator-side boundary
B2 robot-side boundary

The invention claimed is:

1. A robot system comprising:
   a distance image data acquisition device that chronologically and sequentially acquires distance image data containing at least a partial image of a work area for a robot and at least a partial image of an area that an operator or another robot is allowed to enter;
   a reference image data storage which stores at least one reference image data that is to be compared with an image appearing in the series of distance image data in order to recognize the operator or the other robot in the series of distance image data by the comparison; and
   a controller, wherein the controller conducts:
   a recognition process that refers to the reference image data and recognizes the operator or the other robot in the series of distance image data as a security surveillance target;
   an area setting process that sets a common work area in the series of distance image data, the common work area being an area that the robot is allowed to enter and the operator recognized as the security surveillance target or the other robot recognized as the security surveillance target is also allowed to enter;
   a boundary setting process that sets a first boundary and a second boundary in the series of distance image data, the first boundary being a boundary that the operator recognized as the security surveillance target or the other robot recognized as the security surveillance target is allowed to cross for entering the common work area but the robot or a non-target object not recognized as the security surveillance target is not allowed to cross, the second boundary being a boundary that the robot is allowed to cross for entering the common work area but the operator or the other robot is not allowed to cross; and
   a boundary crossing detection process that detects, in the series of distance image data, crossing of the second boundary by the security surveillance target and crossing of the first boundary by the non-target object not recognized as the security surveillance target.

2. The robot system according to claim 1, wherein the controller further conducts a robot stop process that stops the robot when the crossing by the security surveillance target or the non-target object is detected by the boundary crossing detection process.

3. The robot system according to claim 1, wherein, in the series of distance image data, an object which is integrated with the operator or the other robot and which moves together with the operator and the other robot is recognized as the security surveillance target in the recognition process.

4. The robot system according to claim 2, wherein the reference image data is compared to a mark provided on the operator or the other robot appearing in the series of distance image data, and is used to recognize, by the comparison, an object as the security surveillance target integrated with an image corresponding to the mark in the series of distance image data.

5. The robot system according to claim 4, wherein the robot stop process stops the robot when the image corresponding to the mark in the series of distance image data changes more greatly than a predetermined reference extent.

6. The robot system according to claim 1, further comprising a display device for displaying that the security surveillance target in the series of distance image data is being recognized by the recognition process.

7. The robot system according to claim 1, wherein the reference image data contains information regarding a height and a figure of the operator.

8. The robot system according to claim 1, wherein the reference image data storage stores robot reference image data that is to be compared with a robot mark provided on the robot in the series of distance image data in order to recognize the robot in the series of distance image data by the comparison, the robot reference image data are referred to and the robot in the series of distance image data as a security surveillance target robot is recognized by the recognition process, and crossing of the second boundary by an object other than the security surveillance target robot is detected in the series of distance image data by the boundary crossing detection process.

\* \* \* \* \*